Sept. 20, 1932.  D. C. SCOTT ET AL  1,878,193
TESTING MACHINE
Filed May 23, 1927  2 Sheets-Sheet 1
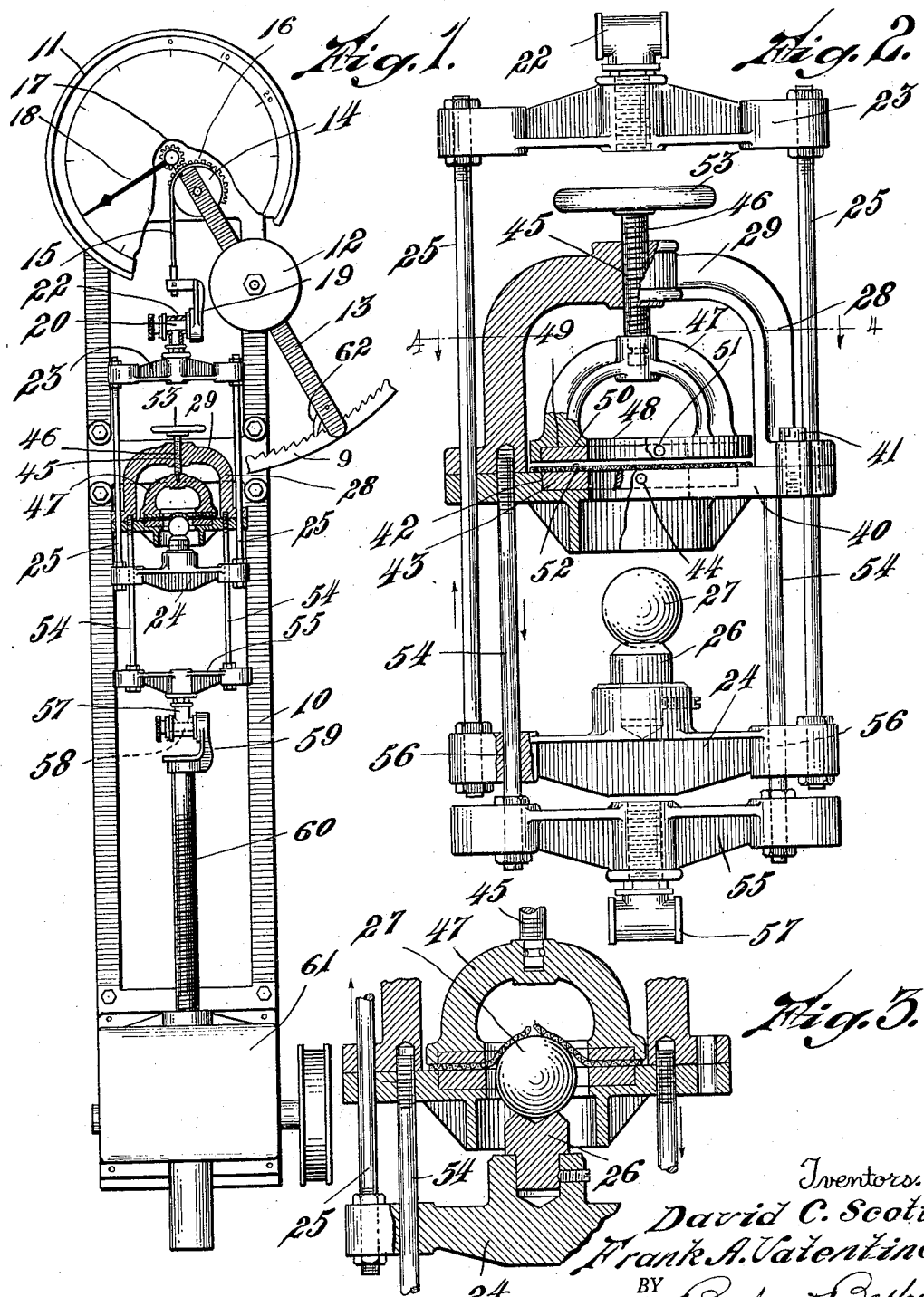
Inventors.
David C. Scott,
Frank A. Valentine.
BY
Barlow & Barlow
ATTORNEYS.

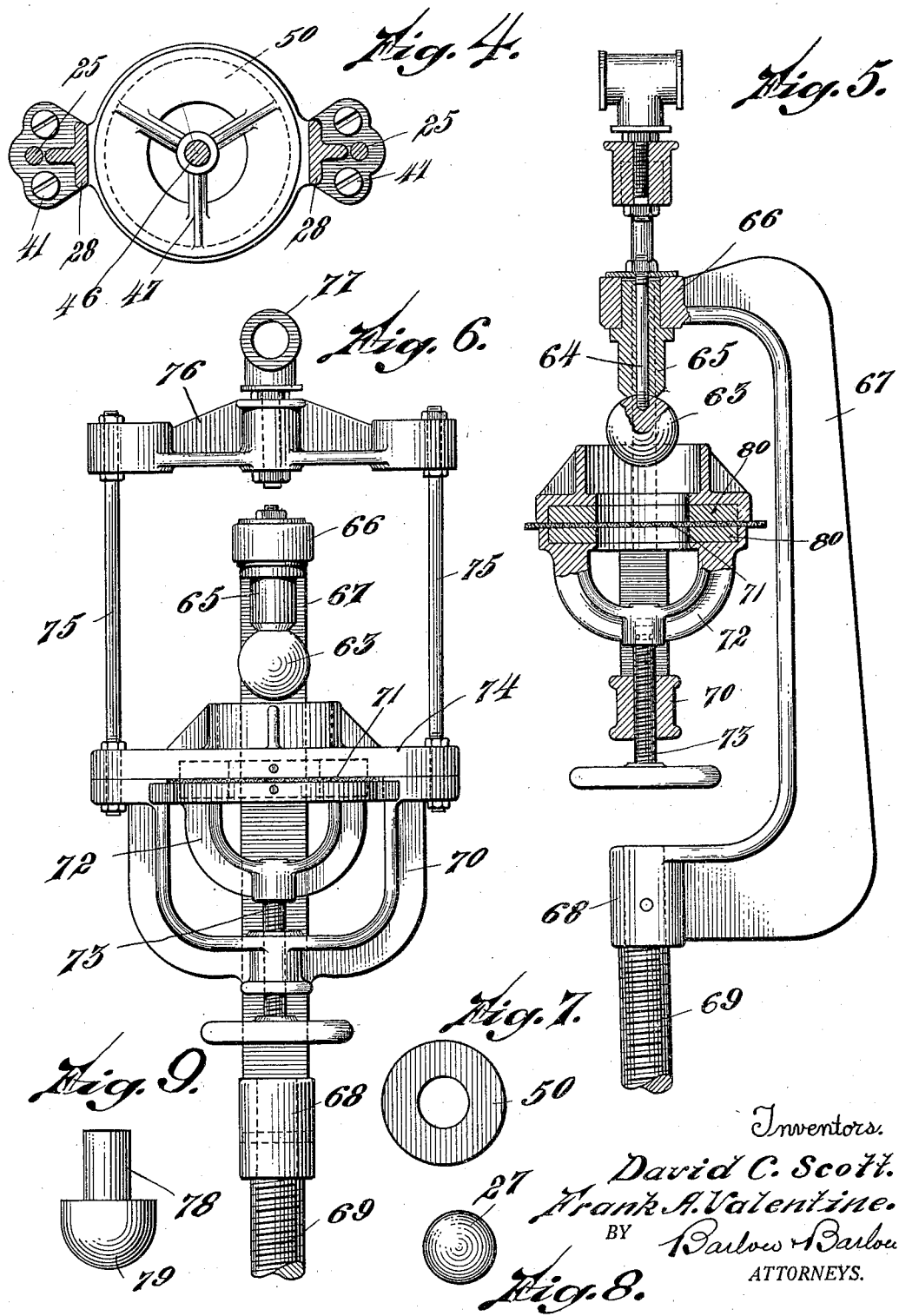

Patented Sept. 20, 1932

1,878,193

UNITED STATES PATENT OFFICE

DAVID C. SCOTT, OF PROVIDENCE, AND FRANK A. VALENTINE, OF APPONAUG, RHODE ISLAND, ASSIGNORS TO HENRY L. SCOTT COMPANY, OF PROVIDENCE, RHODE ISLAND, A CORPORATION OF RHODE ISLAND

TESTING MACHINE

Application filed May 23, 1927. Serial No. 193,431.

This invention relates to an improved construction of testing machine; and has for its object to provide means for obtaining the bursting strength of different materials, the machine being provided with cooperating clamping members arranged to engage the test specimen about an unclamped center portion and to provide a test member to engage and apply a bursting pressure to this unclamped portion of the specimen.

The invention further consists in the provision of power applying means and power resisting and indicating means in the testing machine, also the provision of a clamping member for supporting the test specimen, and a test member for engaging the specimen, one of said members being connected to the power applying means and the other to the power resisting means whereby one of said members is moved relatively to the other to apply a bursting pressure to the unclamped portion of the specimen being tested.

With these and other objects in view, the invention consists of certain novel features of construction, as will be more fully described, and particularly pointed out in the appended claims.

In the accompanying drawings;

Figure 1 is a front elevation of our improved machine partly in section showing the specimen clamps as connected to the power-applying mechanism and the contact test member as connected to the power-resisting mechanism.

Figure 2 shows one form of mechanism comprising clamping means for securing the test specimen and a pressure applying test member in the form of a ball for exerting the bursting pressure, the specimen and the ball being shown in spaced relation.

Figure 3 shows the ball in bursting engagement with the test specimen.

Figure 4 is a section on line 4—4 of Figure 2.

Figure 5 is a side elevation showing another arrangement of mechanism in which the ball is actuated directly by the power-applying mechanism while the test specimen is supported by the power-resisting mechanism.

Figure 6 is a side elevation of the mechanism shown in Figure 5.

Figure 7 shows a detail of one of the ring-shaped clamping plates, of reduced size.

Figure 8 shows one of the contact test members in the form of a sphere.

Figure 9 shows the contact test member in the form of a pin or stud having a semi-spherical engaging end portion.

It is found in the practical construction and operation of testing machines of this character of advantage to provide means for clamping the specimen to be tested between two ring-shaped clamps to secure the unclamped center portion of the specimen and to provide a pressure-exerting member with a rounding engaging face of a size slightly less than the opening in the clamps and to secure one of these members to the power applying screw and the other to the weight-carrying power resisting and indicating mechanism, whereby when the power is applied the blunt or ball face of the pressure member will engage the unclamped central portion of the test specimen with a gradually increasing strain until the specimen bursts, at which time the power resisting weight is temporarily detained until a reading on the dial may be recorded; and the following is a detailed description of the present embodiment of our invention and showing two of a variety of arrangements of mechanism by which these advantageous results may be accomplished:—

With reference to the drawings, 10 designates the frame of a testing machine at the upper end of which is shown a graduated dial 11, a weight 12 mounted on a weight arm 13 arranged to be operated by the tension from the power-applying mechanism through the drum 14 and strap 15. The gear segment 16 operated by the swing of the weight arm 13 engages a pinion 17 to move the hand 18 over the face of the dial in a given proportion to the swing of the arm to indicate the power applied. In the present instance, we have suspended a bracket 19 from the strap 15 which has a pin 20 on which as shown in Figure 1, the fitting 22 is secured and by which the upper test frame is suspended.

This upper test frame, as best shown in Figure 2, is provided with a lower cross head member 24 which is connected to the upper cross head 23 by the side rods 25. The lower cross head is provided with a supporting seat stud 26 on which a pressure test ball 27 is shown as being supported. The opposite cooperating frame member 28 is provided with a U-shaped yoke 29 having a cross head 40 secured thereto by screws 41. This cross head is recessed at 42 to receive one of the ring-shaped clamp plates 43 which is removably secured in the recess by a set screw 44. The upper portion of this yoke is threaded as at 45 to receive the pressure screw 46, the lower end of which is rotatably connected to the small yoke 47, which small yoke is provided with a cross bar 48 recessed at 49 to receive the upper clamp ring 50, which latter ring is retained in position by a set screw 51, whereby the test specimen 52 may be placed between the clamp rings 50 and 43 and firmly secured therebetween by setting up the clamp screw 46 through the hand wheel 53. This upper yoke member 28 is secured through its side rods 54 to the lower cross bar 55, these side rods being guided through openings 56 in the cross bar 24 and this lower cross bar 55 is also provided with a fitting 57 which may be slipped onto the pin 58 in the bracket 59, which bracket is attached to the power-applying screw 60, the screw being actuated by power-applying mechanism (not shown) in the box 61 so that when power is applied through the screw 60 to the frame 28 this frame with its test specimen 52 firmly secured therein is carried down against the ball 27 which is supported through the power-resisting mechanism, above described, including the weight 12, whereby when the specimen comes in contact with the ball and the force applied, the weight arm 13 is caused to swing outwardly causing the indicating finger 18 to sweep the face of the graduated dial and so indicate the amount of force, in pounds pull or other unit of measure, which is being applied, and when the specimen bursts the power-applying mechanism is arrested and the weight arm is temporarily prevented from swinging back to normal by means of a detent pawl 62 which engages the teeth of the arm and gives the operator time to take careful record of the burst strain applied as indicated by the position of the pointer 18.

In some instances, instead of connecting the test pressure ball or member to the power-resisting mechanism, and the test specimen to the power-applying mechanism, as illustrated in Figures 1, 2 and 3, we may reverse this order of connection, as best illustrated in Figures 5 and 6 in which the ball or test pressure member 63 is connected by means of a bolt 64 to the seat 65 and the seat is connected to the head 66 of the arm 67 which is attached at its lower end at 68 to the power-applying screw 69, while the specimen supporting frame 70 in which the specimen 71 is clamped, by means of the clamp rings 80 and the power-applying screw 73 to the cross bar 74, is connected through the side bars 75 and cross head 76 and fitting 77 to the bracket pin 20 of the power-resisting mechanism, above described.

In some instances instead of employing the ball 63 as a test pressure member we may employ a member 78 such as shown in Figure 9, which is provided with an enlarged head rounded on its engaging surface as at 79, or a test pressure member of any desired construction may be employed.

It is found desirable to provide means whereby balls or test pressure members of different sizes may be employed in testing operations as it is found in practice that when testing a piece of netted or knitted fabric owing to the open mesh of the fabric, a much larger ball is required than when testing other specimens such for instance as paper or woven fabrics, and in changing the size of the ball it is found desirable to provide the clamping plates with an opening corresponding in a general way to the size of the ball so that different sizes of clamp rings and test balls may be employed to suit the conditions of the tests.

Our improved testing machine is very simple and practical in construction, is effective in its operation and may be designed to be readily applied to a standard tensile testing machine for also obtaining the bursting test of the specimen.

The foregoing description is directed solely towards the construction illustrated, but we desire it to be understood that we reserve the privilege of resorting to all the mechanical changes to which the device is susceptible, the invention being defined and limited only by the terms of the appended claims.

We claim:

1. In a fabric-strength testing machine the combination with a plunger, of suspending means supporting the plunger for longitudinal yielding movement from a point thereabove, means for indicating the extent of such movement, and perforated clamping plates adapted to telescope over said plunger when forcibly depressed.

2. In a fabric-strength testing machine the combination with a plunger, of suspending means supporting the plunger for longitudinal yielding movement from a point thereabove, means for indicating the extent of such movement, perforated clamping plates telescopically associated with said plunger, and means including a screw connection for forcibly drawing the said clamping plates over the plunger aforesaid.

3. In a testing machine, cooperating ring-shaped clamps for binding the test specimen about an unclamped middle portion, a movable contact member, gravitational means yieldingly resisting movement of said member and means for positively moving said member and specimen clamps relatively to each other to cause the member to engage the unclamped portion of the specimen within the ring with a bursting pressure.

4. In a fabric strength testing machine, a plunger, means supporting the plunger for longitudinal movement, means yieldingly resisting movement of said plunger, means for indicating the extent of such movement, and perforated fabric-clamping plates adapted to telescope over said plunger when forcibly depressed.

5. In a fabric strength testing machine, a plunger, suspending means yieldingly supporting the plunger for longitudinal movement from a point thereabove, means for indicating the extent of such movement, clamping plates mounted in alignment with and telescopically associated with said plunger, and a frame depending from the clamping plates and surrounding the plunger during movement thereof.

6. In a fabric strength testing machine, a plunger, suspending means including pull rods by which said plunger is yieldingly supported from above for longitudinal movement, means for indicating the extent of such movement, and clamping plates mounted in alignment with and adapted to telescope over said plunger when forcibly depressed.

7. In a fabric strength testing machine, a plunger, means by which said plunger is yieldingly supported from above for longitudinal movement, means for indicating the extent of such movement, and perforated clamping plates mounted in alignment with and adapted to telescope over said plunger when forcibly depressed.

8. In a fabric strength testing machine, a plunger, a support from which said plunger projects, means for yieldingly suspending said support and plunger from above, a fabric clamping device movably mounted in alignment with and telescopically associated with said plunger, and means for forcibly drawing said clamping device over said plunger.

9. In a fabric strength testing machine, a plunger, a support from which said plunger projects, said plunger being detachably positioned on said support, a fabric clamping device movably mounted in alignment with and telescopically associated with said plunger, and means for moving said clamping device into telescopic engagement with said plunger.

10. In a testing machine, cooperating perforated clamping members arranged to engage the test specimen about an unclamped center portion, a movable contact member having a blunt working surface, gravitational means yieldingly resisting movement of said member and means for moving said member and specimen clamping members relatively to each other to cause a bursting pressure to be applied to the unclamped portion of the specimen.

11. In a testing machine, cooperating perforated clamping members arranged to engage the test specimen about an unclamped center portion, a movable contact member having a blunt working surface, gravitational means yieldingly resisting movement of said member, means for moving said member and specimen clamping members relative to each other to cause a bursting pressure to be applied to the unclamped portion of the specimen, said moving means being adapted to apply the pressure gradually, and means for indicating the amount of pressure applied.

12. In a testing machine, cooperating perforated clamping members arranged to engage the test specimen about an unclamped center portion thereof, a movable spherically shaped member, gravitational means yieldingly resisting movement of said member and means for gradually applying power to move said spherical shaped member and said clamp members relative to each other to cause the former to engage with and burst said unclamped portion.

13. In a testing machine, cooperating perforated clamping members arranged to engage the test specimen about an unclamped center portion, a movable spherical shaped member, gravitational means yieldingly resisting movement of said member and means for gradually applying power to move said clamping members whereby to cause said spherically shaped member to engage with and burst said unclamped portion, the diameter of said member being less than that of the unclamped portion of the specimen.

14. In a testing machine, a power-applying means, force indicating means, cooperating perforated clamp members shaped to engage the test specimen about an unclamped center portion thereof, a specimen test member, said clamp members and test member being respectively connected to said power-applying means and to said force indicating means, means for movably mounting said test member to move toward and away from said clamp members, means operable by gravity to yieldingly resist the movement of said test member and means in said power-applying means whereby said test member and test specimen are moved relatively to cause a bursting pressure to be exerted on said unclamped center portion of the specimen.

15. In a testing machine, power-applying means, force indicating means, a clamping frame, ring-shaped clamp plates mounted in said frame, means in the frame for operating said plates to clamp the test specimen, a specimen engaging test member, said clamp frame and test member being respectively connected to said power-applying means and to said force indicating means, means for movably mounting said test member to move toward and away from said clamp plates means connected to said last means operable by gravity to yieldingly resist the movement of said member, and means in said power-applying means for relatively moving said test member and frame to cause a bursting pressure to be exerted by the test member on the unclamped portion of the test specimen.

16. In a testing machine, a clamp member arranged to bind a test specimen and leave an unclamped portion, a plunger member telescopically associated with said clamp member, means movably supporting one of said members and means operable by gravity yieldingly supporting the other of said members to resist movement of said movable member and means for causing a relative reciprocal movement between said members.

17. In a fabric strength testing machine, a plunger member, a support for said plunger member, said plunger member being detachable from said support, a fabric clamping member mounted in alignment with and telescopically associated with said plunger member, one of said members being yieldingly supported to resist the movement of the other member, and means for causing relative reciprocal movement between said members.

In testimony whereof we affix our signatures.

DAVID C. SCOTT.
FRANK A. VALENTINE.